United States Patent

[11] 3,578,900

[72] Inventor Donald H. Willis
Indianapolis, Ind.

[21] Appl. No. 728,567
[22] Filed May 13, 1968
[45] Patented May 18, 1971
[73] Assignee RCA Corporation

[54] VIDEO AMPLIFIER CIRCUIT
6 Claims, 1 Drawing Fig.

[52] U.S. Cl. .......... 178/5.4, 330/125, 330/182, 178/6
[51] Int. Cl. .......... H04n 9/48
[50] Field of Search .......... 178/5.4, 6; 330/11, 19, 124, 125, 182, 184

[56] References Cited
UNITED STATES PATENTS

| | | | |
|---|---|---|---|
| 2,999,897 | 9/1961 | Hever et al. | 178/5.4 |
| 3,209,071 | 9/1965 | Bradley | 178/5.4(ACC) |

*Primary Examiner*—Richard Murray
*Assistant Examiner*—Richard P. Lange
*Attorneys*—Eugene M. Whitacre and Kenneth R. Schaefer

ABSTRACT: A video signal processing channel for use in a color television receiver employing a positively poled detector, a first amplifying stage coupled to the detector and a second amplifying stage coupled to the first for amplifying composite color television video signals. The output of the first stage is coupled by means of separate alternating current and direct current coupling means to the input of the second stage. The DC coupling path comprises a variable impedance which provides means for compensating for variations in characteristics of devices employed in the first and second stages, for selectively adjusting the DC level of the video signals applied to the second stage and for selecting an operating threshold for an automatic gain control circuit, the input of which is derived from the output of the second stage. The second stage provides input signals to each of the chrominance, AGC and synchronizing circuits of the receiver while furnishing a low impedance source of signals for the luminance delay line.

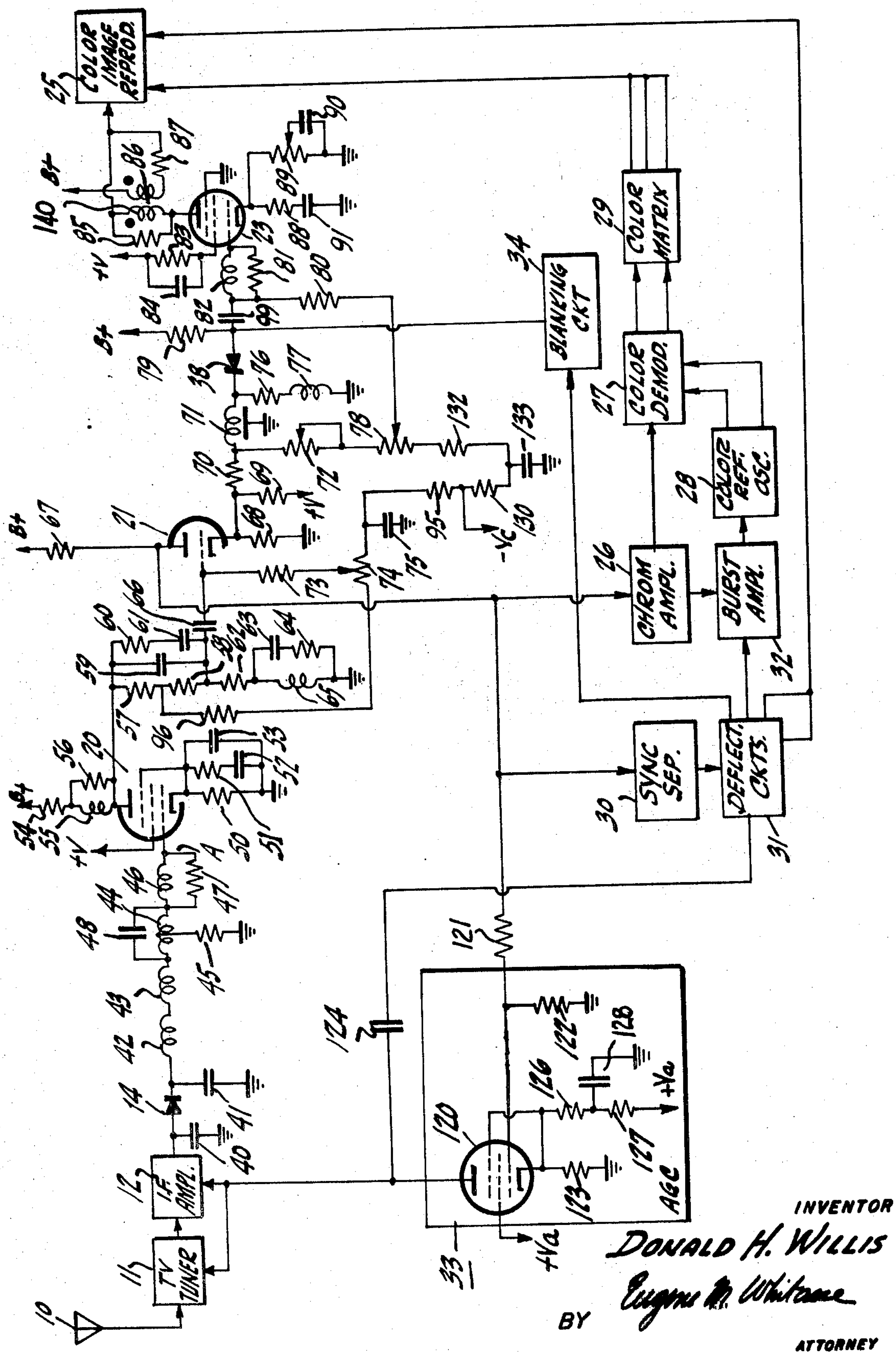
INVENTOR
DONALD H. WILLIS
BY Eugene M. Whitacre
ATTORNEY

VIDEO AMPLIFIER CIRCUIT

DESCRIPTION

This invention relates to video amplifier circuits and, more particularly, to such circuits for use in the luminance channel of a color television receiver.

It is customary in color television receivers to provide separate amplifying channels for the respective luminance and chrominance components of the standard composite color television signal developed by the picture or second detector of the color receiver. The luminance channel serves to supply the luminance signal component, with suitable amplification and delay, to the color image reproducing device of the receiver so as to control the monochrome information in the displayed picture. The chrominance channel serves to supply the chrominance signal component, comprising a color subcarrier and its sidebands, to color demodulation circuitry of the color receiver. The outputs of the color demodulators, after suitable processing, are also supplied to the image reproducing device of the receiver to control the hue and saturation of the color information in the displayed picture.

While the above description indicates separation of the luminance and chrominance channels, it is generally desired for reasons of economy to amplify the chrominance and luminance signals in at least one common stage before separation into respective channels. Besides providing amplification, because of the nature of the luminance signal, it is also desirable to provide DC coupling in the luminance channel.

In addition to picture information, the received composite signal includes other signal components such as color synchronizing bursts and deflection synchronizing pulses which also must be suitably processed subsequent to detection. In addition to their use in synchronizing scanning circuits in the receiver, the synchronizing pulses generally are employed as a measure of received signal strength in an automatic gain control system. Customarily, the AGC system is arranged to maintain a predetermined signal level at the output of the second or picture detector.

In order to insure consistent drive to all of the various signal circuits (AGC, chrominance, sync, luminance delay line), it is desirable to control the signal level as close to the takeoff point for each of these functions as is possible so as to minimize the effect on such signal levels of variations in components between the controlled signal point and the signal takeoff point.

In accordance with a particular embodiment of the present invention, a second detector is poled so as to produce an output having synchronizing signal components more positive than associated image representative signal components. The detector output is coupled to the input of a first video amplifier which serves as a common amplifier for chrominance, luminance, deflection synchronizing and color synchronizing components of the received signal. The output of the first video (common) amplifier includes alternating current AC and direct current DC components. Separate AC and DC coupling paths are provided from the first video amplifier to the input of a second video amplifier. The second video amplifier comprises a first output circuit exhibiting a low impedance for coupling to a delay line and a second output circuit providing relatively high gain for synchronizing, automatic gain control (AGC) and chrominance signals. Variable control means are provided in the DC coupling path to the second amplifier to permit adjustment of the operating characteristics of the AGC system and to provide selective coupling of the DC component of the output of the first amplifier to the second amplifier. Compensation for variations in operating characteristics of the devices utilized for the first and second amplifiers is provided without affecting the AC component of the translated signals.

The novel features that are considered characteristic of this invention are set forth with particularity in the appended claims. The invention itself, however, both as to its organization and method of operation as well as additional objects thereof will best be understood from the following description when read in connection with the accompanying drawing which illustrates, partially in block diagram and partially in schematic form, color television receiver apparatus including a video amplifier circuit constructed in accordance with the present invention.

Referring to the drawing, a television antenna 10 is adapted to receive transmitted television signals and to couple the received signals to the input of a television tuner 11. Tuner 11 may be of a conventional form and includes a radio frequency (RF) amplifier a local oscillator and a mixer stage. The mixer stage serves to convert the RF signals to intermediate frequency (IF) signals and to couple the IF signals to an IF amplifier 12. IF amplifier 12 amplifies the applied signals to a level suitable for application to a video detector including a diode 14. Diode 14 is positively poled (i.e. produces a positive voltage output with synchronizing signal components more positive than associated image representative signal components). The output of the video detector diode 14 is coupled to an input (control grid) electrode of a first video amplifier 20 for suitable amplification and processing of the several components in the composite video television signal. The video amplifier 20 and the remainder of the circuit arrangement associated with video detector diode 14 will be discussed subsequently in detail.

The output of the video amplifier 20 is coupled by means of separate AC and DC paths to the input (control grid) of a second video amplifier 21. A first output (anode) circuit of amplifier 21 provides automatic gain control, synchronizing and chrominance signal components. A second output (cathode) circuit associated with video amplifier 21 provides a luminance signal component to a delay line 71. The delay line 71 is coupled to an input (control grid) of a third video amplifier stage 23, the output (anode) electrode of which is coupled to appropriate electrodes of a color image reproducing device 25 which may, for example, be a three gun shadow mask kinescope.

Video amplifier 21 provides amplified synchronizing signal components to a synchronizing signal separator 30. Sync separator 30, in accordance with well known techniques, separates the deflection synchronizing components from the remainder of the composite signal. The separated synchronizing components are applied to deflection circuits 31 to synchronize the development therein of suitable deflection waveforms for application to appropriate deflecting elements of the color image reproducer 25.

A keyed AGC circuit 33 also is coupled directly to the first output (anode) electrode of the second video amplifier 21 by means of a resistive voltage divider comprising resistors 121 and 122. AGC circuit 33 comprises an AGC amplifier 120 having an input (control grid) electrode coupled to the junction of resistors 121 and 122. A biasing network comprising resistors 123, 126 and 127 and a bypass capacitor 128 is arranged to maintain the cathode electrode of AGC amplifier 120 at a suitable bias voltage with respect to its control grid. Amplifier 120 further comprises a screen grid coupled to a source of screen voltage $+V_a$. The amplifier 120 is gated for conduction by means of a gating or keying pulse coupled by means of a capacitor 124 from the deflection circuitry 31. The output of AGC amplifier 120 is coupled to the television tuner 11 and to the IF amplifier 12 for gain control thereof.

In addition to supplying the synchronizing signal and AGC signal components at its first output electrode, second video amplifier 21 also provides amplified chrominance signal components at that output electrode. The chrominance signal components are coupled from video amplifier 21 to a chrominance amplifier by means of a frequency selective network (not shown). Amplified chrominance signal components produced by chrominance amplifier 26 are coupled to first inputs of each of a plurality of (e.g. two) color demodulators 27. A burst amplifier 32 having a first (keying) input coupled to deflection circuits 31 and a second (burst) input coupled to chrominance amplifier 26 serves to selectively amplify the intermittent reference 3.58 MHz. burst component of the composite television signal. The amplified burst component is supplied to a color reference oscillator 28 for synchronization thereof.

Suitably phased outputs from color reference oscillator 28 are supplied to second inputs of each of the color demodulators 27 to effect synchronous demodulation of the color information contained in the chrominance signal components. Color difference signal outputs are produced by the color demodulators 27 and are applied to color matrix apparatus 29 to develop a set of (e.g. three) color difference signals suitable for application to the color image reproducing device 25.

Retrace blanking of the luminance channel is provided by means of a blanking circuit 34 coupled between deflection circuit 31 and a diode 38. Diode 38 is coupled in series with the luminance signal path to third video amplifier 23 and normally is forward biased for conduction. Blanking circuit 34 is arranged to supply reverse bias to diode 38 during horizontal and/or vertical deflection retrace intervals in a known manner as may be desired.

Specific reference will now be made to the various circuit components shown in the drawing for coupling the video amplifiers 20, 21 and 23 one to another.

A capacitor 40 representing a trapping or filtering arrangement is coupled across the output of IF amplifier 12. The trapping arrangement represented by capacitor 40 typically removes undesired frequency components such as an adjacent channel sound carrier from the input to detector diode 14. A further capacitor 41 is coupled across the output of detector diode 14 and is arranged to remove the IF carrier frequency by filtering action. A positive voltage is produced across capacitor 41 representative of the modulation of the IF carrier. The junction of capacitor 41 and diode 14 is coupled to the input (control grid) of the first video amplifier 20 through a filtering and impedance matching network comprising the series combination of inductor 42, inductor 43, a center tapped inductor 44 and a series peaking coil 46 coupled in the named order between detector 14 and video amplifier 20. The center tap at inductor 44 is returned to a point of reference potential, such as ground, through resistor 45. A damping resistor 47 is coupled in parallel with series peaking coil 46. A tuning capacitor 48 is coupled between the input and output terminals of the center tapped inductor 44, the combination of capacitor 48 and inductor 44 serving as a parallel resonant tank circuit to attenuate the 4.5 MHz intercarrier sound frequency. The screen electrode of the video amplifier 20 is coupled to a source of potential indicated as +V. Self biasing is afforded for first video amplifier 20 by means of a cathode bias resistor 50 coupled to a point of reference potential such as ground. A series network comprising a resistor 51 and a capacitor 52 also is coupled between the cathode of video amplifier 20 and ground to introduce midband gain compensation for the amplifier 20. A capacitor 53 also is coupled across the cathode resistor 50. Capacitor 53 bypasses the degenerative cathode resistor 50 at the higher video frequencies and hence permits increased amplification at those frequencies. The anode of the first video amplifier 20 is coupled to a source of supply voltage B+ via a load resistor 54 in series with a peaking coil 55. A coupling resistor 56 is coupled in parallel with coil 55. The coil 55 and resistor 56 provide high frequency compensation in the anode circuit of the video amplifier 20. A voltage divider comprising the series combination of resistors 57, 58 and 62 and inductor 65 is coupled between the anode electrode of amplifier 20 and ground. A series circuit comprising a capacitor 63 and a resistor 64 is coupled in parallel with inductor 65 to improve high frequency response of the video circuit. An alternating current signal path is provided to the second video amplifier 21 by means of a coupling capacitor 66 coupled from the junction of resistors 58 and 62 to the grid electrode of the second video amplifier 21. The amplitude of the AC component of the video signal coupled to amplifier 21 is determined by the above-mentioned components comprising the voltage divider. A capacitor 59 is coupled between the anode of the first video amplifier 20 and the junction between resistors 58 and 62. Capacitor 59 serves to compensate for attenuation due to shunt or distributed capacity appearing across the input of second video amplifier 21. A series network comprising a resistor 60 and a capacitor 61 coupled across capacitor 59 serves to improve midfrequency response of the video circuit.

Separate direct current coupling is provided from the junction of resistors 57 and 58 (i.e. in the output circuit of amplifier 20) to the grid or input electrode of the second video amplifier 21 by means of the combination of a resistor 96, a variable resistor 74, a resistor 95, and a resistor 73. Resistor 95 is coupled to a source of reference potential such as a negative source $-V_c$. Grid resistor 73 is connected between the grid electrode of the second video amplifier 21 and a wiper arm of variable resistor 74. A bypass capacitor 75 is coupled from the junction of resistors 74 and 95 to ground.

The cathode of the second video amplifier 21 is coupled to one terminal of a degenerative cathode resistor 68. The opposite terminal of resistor 68 is connected to ground. A resistor 69 is coupled between the cathode of amplifier 21 and a source of positive voltage to provide, if desired, a relatively small positive voltage (e.g. +5 volts) to the cathode of the second video amplifier 21 for suitable biasing for linear operation. A load resistor 67 is coupled between the anode of amplifier 21 and the voltage supply B+. The anode electrode of the second video amplifier 21 provides outputs to the chrominance amplifier 26, the sync separator 30 and the AGC circuit 33. The cathode of the amplifier 21 is coupled to the luminance delay line 71 through a resistor 70 selected to match the input impedance of the delay line 71. The resistor 70 is included to indicate that the cathode circuit of amplifier 21 is a relatively low impedance driving source and hence, in order to match the input impedance of the delay line, the additional resistor 70 may be included. It is also noted that circuit components typically are selected such that the signal level at the cathode of amplifier 21 is substantially greater than the signal level at the output of detector diode 14. That is, signal gain is provided between detector 14 and delay line 71 for the luminance signal component.

The output of the delay line 71 is coupled to the series combination of a terminating resistor 76 and an inductor 77 which is returned to ground. The combination of resistor 76 and inductor 77 serves to match the output impedance of delay line 71. The output of the delay line 71 is coupled through normally forward biased diode 38, a capacitor 99, and a peaking network comprising an inductor 82 in parallel with a resistor 81, to the grid of the third video or output amplifier stage 23. Diode 38 normally is forward biased by means of a resistor 79 coupled to B+. Diode 38 also is coupled to blanking circuit 34 for blanking of the luminance channel during retrace time.

The DC component of the video signal is coupled to the grid of third video amplifier 23 by means of a voltage divider including a variable resistor 72 having a first terminal coupled to the junction of resistor 70 and delay line 71 and a second terminal coupled to a variable resistor 78. Resistor 78, in turn, is coupled through a series path comprising resistors 132 and 130 to the source of negative potential $-V_c$. A resistor 80 completes the DC path from the wiper arm of resistor 78 to the junction of capacitor 99 and resistor 81. Resistor 78 serves as a brightness control for the image produced on image reproducing device 25. Resistor 78 serves to vary the DC operating level of the luminance signal component supplied to device 25. Brightness control arrangements of this type are further described in U. S. Pat. No. 2,872,617, entitled "A Color Television Receiver Brightness Control " granted to J. Stark, Jr. et al. on Feb. 3, 1959, and assigned to the same assignee as the present invention.

The screen electrode of the third video amplifier 23 is coupled to a source of positive potential through a series resistor 83 shunted by a capacitor 84, the combination serving to provide a suitable screen bias for class A operation of amplifier 23. A series network comprising a resistor 88 and a capacitor 91 arranged for high frequency compensation and a direct current path comprising a variable resistor 89 each are connected between the cathode of third video amplifier 23 and ground. Resistor 89 includes a variable tap bypassed to ground by means of a capacitor 90. The resistor 89 and capacitor 90 serve as a contrast control. More or less of the resistance 89 may be bypassed thereby varying the degree of degeneration in video amplifier 23. When the tap of resistor 89 is adjusted towards the cathode of amplifier 23, more of the resistance is bypassed and hence the gain of the amplifier 23 is increased without affecting the DC biasing of the amplifier 23.

The anode of amplifier 23 is coupled to B+ via the series combination of a peaking inductor 86, a resistor 87 and a peaking coil 140 shunted by a damping resistor 85. The combination of coil 86 and coil 140 affords high frequency compensation in amplitude and phase for the video output signal. The frequency response is further improved by mutually coupling coil 140 to coil 86. The junction between the resistor 87 and the parallel combination of inductor 140 and resistor 85 is directly coupled to suitable electrodes such as the cathodes of the color image reproducing device 25 to provide the luminance information to device 25.

Operation of the luminance channel including video amplifiers 20, 21 and 23 now will be described referring to typical signal levels and amplification factors (gain). The AGC circuit 33 will be assumed to be adjusted by means of resistor 74 such that a positive video signal is produced at the output of detector diode 14 with a peak to peak amplitude of approximately 2.5 volts. It should be noted that adjustment of the AGC control resistor 74 directly affects the bias of the second video amplifier 21 and only indirectly affects the level at diode 14.

The first video amplifier 20 is biased for linear operation for the nominal 2.5 volt peak to peak signal applied to its control grid and is arranged to provide a voltage gain of approximately 18 times. Therefore, the amplified composite video signal appearing at the anode of amplifier 20 has a peak to peak amplitude of the order of 45 volts. Amplifier 20 also operates to invert the applied video signal such that the synchronizing signal component supplied to amplifier 21 will be the most-negative portion of the composite video signal. The minimum voltage (i.e. sync tips) produced at the anode of amplifier 20 typically is greater than +80 volts in order to insure linear operation of amplifier 20. Voltage divider 57, 58, 62, 65 is arranged such that the AC component supplied at the junction of resistors 58 and 62 is approximately one-fourth the AC component provided at the anode electrode of amplifier 20. Therefore, an AC component of the composite television signal having a peak to peak amplitude of approximately 10 volts is coupled via capacitor 66 to the input (control grid) of the second video amplifier 21. A portion of the DC component of the composite video signal produced at the anode electrode of amplifier 20 is coupled to the grid of the second video amplifier 21 from the junction of resistors 57 and 58 by means of the relatively high impedance network comprising resistor 96, variable resistor 74, resistor 73 and resistor 95. Resistor 73 is arranged to couple the selected portion of the DC component of the video signal from the variable wiper arm of AGC control resistor 74 to the input (grid) of second video stage 21.

The DC component of the video signal produced at the output (anode) of first video amplifier 20 is in excess of 100 volts and is of positive polarity. Use of this DC component directly at the input (grid) of second video amplifier 21 would require application of a substantial positive voltage of the same order of magnitude to the cathode of video amplifier 21. In accordance with one aspect of the present invention, the DC signal component provided at the anode of video amplifier 20 is translated to a substantially lower voltage level by means of the voltage divider 57, 58, 62, 65 and the coupling network 96, 74, 95, 73. That is, variations in the DC component provided at the anode of amplifier 20 which represents changes in average scene brightness are coupled to video amplifier 21 but the DC component attributed to the supply voltage for the anode of amplifier 20 is substantially removed. Resistor 95 is returned to a negative supply $-V_c$ (e.g. −100 volts) so as to effect the desired voltage translation. The voltage divider and additional components are selected such that variations in the DC component of the composite video signal supplied at the anode of amplifier 20 is coupled to the input of second video amplifier 21 in proportion to the reduced accompanying AC component supplied via capacitor 66. Variation of the setting of resistor 74, while effecting a change in the bias applied to second video amplifier 21, is arranged to produce an insignificant effect on the nominal voltage division of the DC signal component supplied to amplifier 21.

The variable resistor 74 is employed in accordance with a further aspect of the present invention to select the desired video signal level which is to be maintained by AGC circuit 33 at the output of second video amplifier 21.

In a typical case, for an 85 percent modulated RF signal input of the order of 1000 microvolts to tuner 11, the resistor 74 is adjusted such that the peak to peak signal level at the anode of second video amplifier 21 is 100 volts.

The manner in which the AGC circuit 33 operates to provide this result will now be described. AGC amplifier 120 is biased by means of resistors 123, 126 and 127, the latter being coupled to the positive voltage supply $+V_a$ so as to conduct whenever synchronizing signal tips at the output (anode) of second video amplifier 21 exceed a predetermined voltage level. Conduction in AGC amplifier 120 causes a change in the AGC signal applied to tuner 11 and IF amplifier 12 so as to reduce the gain of those elements to maintain the desired sync tip level at the second video amplifier 21. If the sync tips are below the predetermined level, AGC circuit 33, tuner 11 and IF amplifier 12 operate in a well known manner to increase gain and restore the predetermined sync tip level. Adjustment of resistor 74 produces a momentary change in the sync tip level at the output of video amplifier 21 which causes AGC circuit 33 to operate in a compensating manner to restore the predetermined sync tip level. However, in order to restore the sync tip level, the gain of tuner 11 and/or IF amplifier 12 are changed producing a change in the peak to peak signal level at the output of second video amplifier 21. Resistor 74 therefore may be adjusted to provide the desired peak to peak signal level at the output of amplifier 21 which is substantially maintained by operation of AGC circuit 33 as input signal level changes.

Since AGC circuit 33 is arranged to maintain the sync tip level at a predetermined level at the output of second video amplifier 21, the apparent effect of varying resistor 74 is to fix the white level of the video signal at that point. The video signal output of amplifier 21, which serves as the takeoff point for each of the AGC, sync, chrominance and luminance signals, therefore is maintained between two substantially fixed voltage levels for a wide range of received R.F. signal levels.

While the invention has been described in terms of a preferred embodiment, certain aspects thereof may be realized utilizing different configurations.

One example of a particular configuration constructed in accordance with the present invention is set forth below in terms of component and supply voltage values.

| | |
|---|---|
| Capacitor 40 | 3 micromicrofarads |
| Capacitor 41 | 10 micromicrofarads |
| Inductor 42 | 1.8 microhenries |
| Inductor 43 | 5.6 microhenries |
| Inductor 44 | 84 microhenries |
| Capacitor 48 | 150 micromicrofarads |
| Resistor 45 | 4300 ohms |
| Inductor 46 | 120 microhenries |
| Resistor 47 | 1200 ohms |
| Resistor 50 | 220 ohms |
| Resistor 51 | 22 ohms |
| Capacitor 52 | 680 micromicrofarads |
| Capacitor 53 | 270 micromicrofarads |
| Resistor 54 | 15000 ohms |
| Inductor 55 | 270 microhenries |

| | |
|---|---|
| Resistor **56** | 5600 ohms |
| Resistor **57** | 15000 ohms |
| Resistor **58** | 1200 ohms |
| Capacitor **59** | 18 micromicrofarads |
| Resistor **60** | 150,000 ohms |
| Capacitor **61** | 7 micromicrofarads |
| Resistor **62** | 4700 ohms |
| Capacitor **63** | 27 micromicrofarads |
| Resistor **64** | 2200 ohms |
| Inductor **65** | 270 microhenries |
| Capacitor **66** | 0.047 microfarads |
| Resistor **67** | 15,000 ohms |
| Resistor **68** | 1000 ohms |
| Resistor **69** | 12,000 ohms |
| Resistor **70** | 270 ohms |
| Delay line **71** input and output impedance | 680 ohms |
| Resistor **72** | 500,000 ohms |
| Resistor **73** | 1,000,000 ohms |
| Resistor **74** | 2,500,000 ohms |
| Capacitor **75** | 0.047 microfarads |
| Resistor **76** | 750 ohms |
| Inductor **77** | 27 microhenries |
| Resistor **78** | 150,000 ohms |
| Resistor **79** | 680,000 ohms |
| Resistor **80** | 100,000 ohms |
| Resistor **81** | 2200 ohms |
| Inductor **82** | 120 microhenries |
| Resistor **83** | 22,000 ohms |
| Capacitor **84** | 0.22 microfarads |
| Resistor **85** | 10,000 ohms |
| Resistor **87** | 6800 ohms |
| Resistor **88** | 220 ohms |
| Resistor **89** | 100 ohms |
| Capacitor **90** | 150 microfarads |
| Capacitor **91** | 680 micromicrofarads |
| Resistor **95** | 5,600,000 ohms |
| Resistor **96** | 330,000 ohms |
| Resistor **121** | 120,000 ohms |
| Resistor **122** | 36,000 ohms |
| Resistor **123** | 18,000 ohms |
| Resistor **126** | 1500 ohms |
| Resistor **127** | 56,000 ohms |
| Capacitor **128** | 2 microfarads |
| Capacitor **124** | 68 micromicrofarads |
| Resistor **130** | 820,000 ohms |
| Resistor **132** | 1,000,000 ohms |
| Capacitor **133** | 0.047 microfarads |
| Pentode of Amplifier **20** | **1/2 6GH8** |
| Triode of Amplifier **21** | **1/2 6GH8** |
| Pentode of Amplifier **23** | **12 HG7** |
| Pentode **120** | **1/2 6GH8A** |
| B+ | +405 volts |
| $-V_c$ | $-100$ volts |
| +V | +140 volts |
| $+V_a$ | +270 volts |

I claim:

1. In a color television receiver including a source of composite color video signals having a luminance component, a chrominance component, a deflection synchronizing component and a color synchronizing component, the combination comprising first video signal amplifying means direct current coupled to said source said first amplifying means operated in a high gain signal inversion mode and having an output circuit for providing amplified video signals characterized by a substantial direct component of one polarity, second video signal amplifying means, having an input terminal, and having a low impedance output terminal for providing a signal of the same polarity as that signal applied to said input terminal and a high impedance output terminal for providing a signal of a polarity opposite to that at said low impedance terminal, attenuating means for coupling only alternating signal components from said output of said first amplifying means to said second amplifying means, automatic gain control means having an input terminal direct current coupled to said high impedance output terminal of said second amplifying means and having an output terminal direct coupled to said source of composite signals to maintain the amplitude of said signals at a predetermined level, separate means for coupling direct current signal components from said output of said first amplifying means to said second amplifying means without coupling said substantial direct component to said second amplifying means, said direct current signal components being coupled in proportion to the amplitude of said attenuated alternating signal components to maintain a predetermined ratio therebetween, said separate means including variable biasing means coupled to said second amplifying means for varying operating conditions of said automatic gain control means, and delay line means coupled to said low output impedance terminal of said second video amplifying means for providing a delayed luminance signal of an amplitude relatively independent of said operation of said variable biasing means.

2. The combination according to claim 1 wherein said separate means comprises resistive means coupled to said output circuit, a source of voltage of opposite polarity with respect to said one polarity coupled to said resistive means remote from said output circuit, and direct coupling means coupled from said resistive means to said second amplifying means.

3. The combination according to claim 2 wherein said resistive means comprises a variable resistance for supplying operating bias to said second amplifying means.

4. The combination according to claim 1 wherein said separate coupling means further comprises resistive means coupled to said first amplifier, a source of bias voltage coupled to said resistive means remote from said first amplifier, and direct coupling means coupled from said resistive means to said second amplifier.

5. The combination according to claim 4 wherein said resistive means comprises a variable resistance for supplying operating bias to said second amplifying means.

6. In a color television receiver, a luminance channel comprising in combination:

a. a second detector for providing at its output a composite video signal having the synchronizing pulses more positive than the rest f the signal,
b. a first video amplification stage for said composite video signal having an input and an output at which the polarity of signals is opposite to that at said input,
c. means coupling said input of said first video stage to the output of said second detector,
d. a second video amplification stage having an input, a low impedance output at which the polarity of the signal is the same as at its input, and a high gain output at which the polarity of the signals is opposite to their polarity at said input,
e. capacitive alternating current circuit means, involving a video peaking circuit, for coupling said input of said second video amplification stage to said output of said first video amplification stage,
f. variable direct current circuit means for further coupling said input of said second video amplification stage to said output of said first video amplification stage,
g. a third video amplification stage having an input and an output at which signals appear with a polarity opposite to that at said input,
h. means including a time delay means coupling said low impedance output of said second video amplification stage to said input of said third video amplification stage, and
i. automatic gain control means having an input direct coupled to said high gain output of said second video amplifier and an output terminal for developing a control voltage proportional to the magnitude of said composite video signal and in accordance with the setting of said variable direct current means.

UNITED STATES PATENT OFFICE
CERTIFICATE OF CORRECTION

Patent No. 3,578,900 Dated May 18, 1971

Inventor(s) Donald H. Willis

It is certified that error appears in the above-identified patent and that said Letters Patent are hereby corrected as shown below:

Column 3, line 61, that portion reading "A coupling resistor 56" should read -- A damping resistor 56 --. Column 8, line 47, that portion reading "f" should read -- of --. Column 8, line 58, that portion reading "involving" should read -- including --.

Signed and sealed this 14th day of September 1971.

(SEAL)
Attest:

EDWARD M.FLETCHER,JR.
Attesting Officer

ROBERT GOTTSCHALK
Acting Commissioner of Patents